US00RE48365E

(19) United States
(12) Reissued Patent
Juhasz

(10) Patent Number: US RE48,365 E
(45) Date of Reissued Patent: Dec. 22, 2020

(54) MOBILE MOTHERBOARD

(71) Applicant: Mobile Motherboard Inc., Houston, TX (US)

(72) Inventor: Paul Juhasz, Houston, TX (US)

(73) Assignee: Mobile Motherboard Inc., Houston, TX (US)

(21) Appl. No.: 16/210,598

(22) Filed: Dec. 5, 2018

Related U.S. Patent Documents

Reissue of:
(64) Patent No.: 7,990,724
Issued: Aug. 2, 2011
Appl. No.: 12/002,090
Filed: Dec. 14, 2007

U.S. Applications:
(60) Provisional application No. 60/875,842, filed on Dec. 19, 2006.

(51) Int. Cl.
*H05K 7/00* (2006.01)
*G06F 1/18* (2006.01)

(52) U.S. Cl.
CPC ..... *G06F 1/184* (2013.01)

(58) Field of Classification Search
CPC ..... G06F 1/184
See application file for complete search history.

(56) References Cited

U.S. PATENT DOCUMENTS 3,787,818 A 1/1974 Arnold et al.
3,996,585 A 12/1976 Hogan
(Continued)

FOREIGN PATENT DOCUMENTS

CN 95106370 A 5/1995
CN 1297288 5/2001
(Continued)

OTHER PUBLICATIONS

Notice and Supplemental Notice of Allowance and Fees Due (PTOL-85). "Mobile Motherboard", U.S. Appl. No. 12/002,090, May 9, 2011, USPTO (12 pages).
(Continued)

*Primary Examiner* — Woo H. Choi
(74) *Attorney, Agent, or Firm* — The Juhasz Law Firm

(57) ABSTRACT

A motherboard for a computer box having internal circuitry and communication ports comprises a portable motherboard having a connector for connection to an externally accessible connector of said computer box; wherein, connection of said portable motherboard connector to said externally accessible computer box connector enables said computer box to perform computing operations. The inventive motherboard is portably configured to serve one or more computers, preferably a personal computer or laptop. The portable motherboard provides a computer box with a brain. Alternatively, where a computer with a brain is slow, the portable motherboard may be used to boost the brainpower of the slow computer. Whether the portable motherboard brings life to a computer box or boosts the microprocessor power of a computer containing an internal microprocessor, the portable motherboard is a powerful invention that makes microprocessor power more efficient and ubiquitous.

24 Claims, 10 Drawing Sheets

(56) References Cited

U.S. PATENT DOCUMENTS 4,141,068 A 2/1979 Mager et al.
4,228,496 A 10/1980 Katzman et al.
4,232,356 A 11/1980 Saunders et al.
4,453,215 A 6/1984 Reid
4,623,964 A 11/1986 Getz et al.
4,670,837 A 6/1987 Sheets
4,680,674 A 7/1987 Moore
4,700,362 A 10/1987 Todd et al.
4,760,276 A 7/1988 Lethellier
4,769,764 A * 9/1988 Levanon ..... 361/679.09
4,791,524 A 12/1988 Teigen et al.
4,791,531 A 12/1988 Jessup
4,799,258 A 1/1989 Davies
4,814,970 A 3/1989 Barbagelata et al.
4,816,993 A 3/1989 Takahashi et al.
4,872,091 A 10/1989 Maniwa et al.
4,876,644 A 10/1989 Nuechterlein et al.
4,890,282 A 12/1989 Lambert et al.
4,918,572 A 4/1990 Tarver et al.
4,939,735 A 7/1990 Fredericks et al.
4,941,841 A 7/1990 Darden et al.
5,056,141 A 10/1991 Dyke
5,077,683 A 12/1991 Aydin
5,086,499 A 2/1992 Mutone
5,103,446 A 4/1992 Fischer
5,136,718 A 8/1992 Haydt
5,187,645 A 2/1993 Spalding et al.
5,191,581 A 3/1993 Woodbury et al.
5,227,957 A 7/1993 Deters
5,251,097 A 10/1993 Simmons et al.
5,277,615 A 1/1994 Hastings et al.
5,278,509 A 1/1994 Haynes et al.
5,278,730 A 1/1994 Kikinis
5,282,247 A 1/1994 McLean et al.
5,293,487 A 3/1994 Russo et al.
5,293,497 A 3/1994 Free
5,297,272 A 3/1994 Lu et al.
5,311,397 A 5/1994 Harshberger et al.
5,317,441 A 5/1994 Sidman
5,317,477 A 5/1994 Gillett
5,319,771 A 6/1994 Takeda
5,325,517 A 6/1994 Baker et al.
5,331,509 A 7/1994 Kikinis
5,337,464 A 8/1994 Steffes
5,339,408 A 8/1994 Bruckert et al.
5,349,132 A 9/1994 Miller et al.
5,355,391 A 10/1994 Horowitz et al.
5,373,149 A 12/1994 Rasmussen
5,377,356 A 12/1994 Molyneaux
5,428,806 A 6/1995 Pocrass
5,430,607 A 7/1995 Smith
5,432,939 A 7/1995 Blackledge, Jr. et al.
5,436,857 A 7/1995 Nelson et al.
5,436,902 A 7/1995 McNamara et al.
5,463,742 A 10/1995 Kobayashi
5,504,918 A 4/1996 Collette et al.
5,519,843 A 5/1996 Moran
5,533,125 A 7/1996 Bensimon et al.
5,537,544 A 7/1996 Morisawa et al.
5,539,616 A 7/1996 Kikinis
5,546,463 A 8/1996 Caputo et al.
5,550,710 A 8/1996 Rahamim et al.
5,550,861 A 8/1996 Chan et al.
5,552,776 A 9/1996 Wade et al.
5,555,158 A 9/1996 Dent
5,566,226 A 10/1996 Mizoguchi et al.
5,572,441 A 11/1996 Boie
5,577,205 A 11/1996 Hwang et al.
5,578,940 A 11/1996 Dillon
5,588,850 A 12/1996 Pan et al.
5,589,406 A 12/1996 Kato et al.
5,590,027 A * 12/1996 Provenzale ..... 361/732
5,590,377 A 12/1996 Smith
5,600,800 A 2/1997 Kikinis et al.
5,602,721 A 2/1997 Slade et al.
5,603,044 A 2/1997 Annapareddy et al.
5,606,717 A 2/1997 Farmwald et al.
5,608,608 A 3/1997 Flint et al.
5,623,637 A 4/1997 Jones et al.
5,628,031 A 5/1997 Kikinis et al.
5,630,057 A 5/1997 Hait
5,636,264 A 6/1997 Salavuaori et al.
5,638,521 A 6/1997 Buchala et al.
5,640,302 A 6/1997 Kikinis
5,648,762 A 7/1997 Ichimura et al.
5,659,773 A 8/1997 Huynh et al.
5,663,661 A 9/1997 Dillon et al.
5,664,228 A 9/1997 Mital
5,671,430 A 9/1997 Gunzinger
5,673,172 A 9/1997 Hastings et al.
5,673,174 A * 9/1997 Hamirani ..... 361/679.32
5,680,126 A 10/1997 Kikinis
5,680,536 A 10/1997 Tyuluman
5,689,406 A 11/1997 Wood et al.
5,689,654 A 11/1997 Kikinis
5,694,294 A 12/1997 Ohashi et al.
5,696,983 A 12/1997 Watanabe et al.
5,708,563 A 1/1998 Cranston, III et al.
5,708,840 A 1/1998 Kikinis et al.
5,721,837 A 2/1998 Kikinis
5,721,842 A 2/1998 Beasley et al.
5,724,591 A 3/1998 Hara et al.
5,726,922 A 3/1998 Womble et al.
5,737,194 A 4/1998 Hopkins et al.
5,737,524 A 4/1998 Cohen et al.
5,745,733 A 4/1998 Robinson
5,748,912 A 5/1998 Lee
5,751,711 A 5/1998 Sakaue
5,752,080 A 5/1998 Ryan
5,761,033 A 6/1998 Wilhelm
5,764,924 A 6/1998 Hong
5,774,703 A 6/1998 Weiss et al.
5,774,704 A 6/1998 Williams
5,793,989 A 8/1998 Moss et al.
5,795,228 A 8/1998 Trumbull
5,802,391 A 9/1998 Hwang
5,805,474 A 9/1998 Danielson et al.
5,805,903 A 9/1998 Elkhoury
5,809,262 A 9/1998 Potter
5,809,538 A 9/1998 Pollmann
5,815,681 A 9/1998 Kikinis
5,816,725 A 10/1998 Sherman et al.
5,819,050 A 10/1998 Boehling et al.
5,822,608 A 10/1998 Dieffenderfer et al.
5,826,048 A 10/1998 Dempsey et al.
5,838,932 A 11/1998 Alzien
5,844,824 A 12/1998 Newman et al.
5,848,249 A 12/1998 Garbus
5,848,298 A 12/1998 Steere
5,857,085 A 1/1999 Zhang et al.
5,859,669 A 1/1999 Prentice
5,862,350 A 1/1999 Coulson
5,862,381 A 1/1999 Advani et al.
5,863,211 A 1/1999 Sobotta et al.
5,878,211 A 3/1999 Delagrange et al.
5,878,282 A 3/1999 Mital
5,884,049 A 3/1999 Atkinson
5,884,053 A 3/1999 Clouser et al.
5,887,145 A 3/1999 Harari et al.
5,907,566 A 5/1999 Benson et al.
5,909,357 A 6/1999 Orr
5,909,559 A 6/1999 So
5,930,110 A 7/1999 Nishigaki et al.
5,933,609 A 8/1999 Walker et al.
5,935,226 A 8/1999 Klein
5,938,757 A 8/1999 Bertsch
5,941,965 A 8/1999 Moroz
5,948,047 A 9/1999 Jenkins et al.
5,948,087 A 9/1999 Khan et al.
5,949,644 A 9/1999 Park
5,960,213 A 9/1999 Wilson
5,965,957 A 10/1999 Bourgeois et al.
5,968,144 A 10/1999 Walker et al.
5,971,804 A 10/1999 Gallagher et al.

(56) References Cited

U.S. PATENT DOCUMENTS 5,974,486 A 10/1999 Siddappa
5,977,989 A 11/1999 Lee et al.
5,978,821 A 11/1999 Freeny
5,978,919 A 11/1999 Doi et al.
5,982,363 A 11/1999 Naiff
5,982,614 A 11/1999 Reid
5,987,553 A 11/1999 Swamy et al.
5,991,163 A 11/1999 Marconi et al.
5,991,601 A 11/1999 Anderson
5,991,833 A 11/1999 Wandler et al.
5,991,844 A 11/1999 Khosrowpour
5,999,476 A 12/1999 Dutton et al.
5,999,952 A 12/1999 Jenkins et al.
6,002,442 A 12/1999 Li et al.
6,003,105 A 12/1999 Vicard et al.
6,006,243 A 12/1999 Karidis
6,008,985 A 12/1999 Lake et al.
6,009,488 A 12/1999 Kavipurapu
6,011,546 A 1/2000 Bertram
6,012,145 A 1/2000 Mathers et al.
6,016,252 A 1/2000 Pignolet et al.
6,016,432 A 1/2000 Stein
6,021,453 A 2/2000 Klingman
6,025,989 A 2/2000 Ayd et al.
6,028,643 A 2/2000 Jordan et al.
6,029,183 A 2/2000 Jenkins et al.
6,035,356 A 3/2000 Khan et al.
6,037,981 A 3/2000 Wilson et al.
6,038,621 A 3/2000 Gale et al.
6,040,792 A 3/2000 Watson et al.
6,046,571 A 4/2000 Bovio et al.
6,049,449 A 4/2000 Cranston, III et al.
6,049,823 A 4/2000 Hwang
6,052,513 A 4/2000 McLaren
6,058,011 A 5/2000 Hardt et al.
6,061,306 A 5/2000 Bucheim
6,065,679 A 5/2000 Levie
6,069,615 A 5/2000 Abraham et al.
6,070,211 A 5/2000 Neal et al.
6,070,214 A 5/2000 Ahern
6,078,503 A 6/2000 Gallagher et al.
6,088,224 A 7/2000 Gallagher et al.
6,088,620 A 7/2000 Ninomiya et al.
6,088,752 A 7/2000 Ahern
6,091,737 A 7/2000 Hong et al.
6,104,921 A 8/2000 Cosley et al.
6,108,732 A 8/2000 Klein
6,137,686 A 10/2000 Saye
6,145,085 A 11/2000 Tran et al.
6,153,881 A 11/2000 Castleman
6,157,533 A 12/2000 Sallam et al.
6,157,534 A 12/2000 Gallagher et al.
6,157,537 A 12/2000 Cheng
6,161,524 A 12/2000 Akbarian et al.
6,163,464 A 12/2000 Ishibashi et al.
6,175,490 B1 1/2001 Papa et al.
6,188,571 B1 2/2001 Roganti et al.
6,188,602 B1 2/2001 Alexander et al.
6,195,670 B1 2/2001 Freeny
6,199,134 B1 3/2001 Deschepper et al.
6,202,169 B1 3/2001 Razzaghe-Ashrafi et al.
6,208,522 B1 3/2001 Manweiler et al.
6,216,185 B1 4/2001 Chu
6,220,346 B1 4/2001 Gissler
6,226,700 B1 5/2001 Wandler et al.
6,229,700 B1 5/2001 Liu et al.
6,229,710 B1 5/2001 Chen
6,233,393 B1 5/2001 Yanagihara et al.
6,240,302 B1 5/2001 Harrison
6,246,573 B1 6/2001 Khan et al.
6,256,689 B1 7/2001 Khosrowpour
6,256,691 B1 7/2001 Moroz et al.
6,260,155 B1 7/2001 Dellacona
6,261,104 B1 7/2001 Leman
6,266,539 B1 7/2001 Pardo
6,275,375 B1 8/2001 Nam
6,275,922 B1 8/2001 Bertsch
6,288,893 B1 9/2001 Faranda et al.
6,289,376 B1 9/2001 Taylor et al.
6,292,148 B1 9/2001 Matsuura et al.
6,297,955 B1 10/2001 Frank, Jr. et al.
6,301,104 B1 * 10/2001 Hu ..... 361/679.02
6,301,637 B1 10/2001 Krull et al.
6,304,459 B1 10/2001 Toyosato et al.
6,304,895 B1 10/2001 Schneider et al.
6,307,742 B1 10/2001 Diaz et al.
6,311,268 B1 10/2001 Chu
6,311,287 B1 10/2001 Dischler et al.
6,314,522 B1 11/2001 Chu et al.
6,317,329 B1 11/2001 Dowdy et al.
6,321,335 B1 11/2001 Chu
6,324,605 B1 11/2001 Rafferty et al.
6,324,607 B1 11/2001 Korowitz et al.
6,325,636 B1 12/2001 Hipp et al.
6,327,152 B1 12/2001 Saye
6,332,180 B1 12/2001 Kauffman et al.
6,336,039 B1 1/2002 Usui et al.
6,342,664 B2 1/2002 Sawada
6,345,330 B2 2/2002 Chu
6,351,375 B1 2/2002 Hsieh et al.
6,366,951 B1 4/2002 Schmidt
6,369,849 B1 4/2002 Rzyski
6,370,546 B1 4/2002 Kondo
6,373,715 B1 4/2002 Zeng et al.
6,377,446 B1 4/2002 Liau
6,378,009 B1 4/2002 Pinkston, II et al.
6,381,602 B1 4/2002 Shoroff et al.
6,381,836 B1 * 5/2002 Lauruhn et al. ..... 29/831
6,389,499 B1 5/2002 Frank, Jr. et al.
6,393,561 B1 5/2002 Hagiwara et al.
6,396,472 B1 5/2002 Jacklin
6,401,124 B1 6/2002 Yang et al.
6,405,278 B1 6/2002 Liepe
6,411,506 B1 6/2002 Hipp et al.
6,418,499 B1 7/2002 Korowitz et al.
6,425,033 B1 7/2002 Conway et al.
6,430,644 B1 * 8/2002 Luen et al. ..... 710/300
6,446,192 B1 9/2002 Narasimhan et al.
6,449,892 B1 9/2002 Jenkins
6,452,789 B1 9/2002 Pallotti et al.
6,452,790 B1 9/2002 Chu et al.
6,453,344 B1 9/2002 Ellsworth
6,460,106 B1 10/2002 Stufflebeam
6,463,519 B1 10/2002 Yoshida et al.
6,467,009 B1 10/2002 Winegarden et al.
6,469,901 B1 10/2002 Costner
6,482,042 B1 11/2002 Tupper
6,490,157 B2 12/2002 Unrein
6,496,361 B2 12/2002 Kim et al.
6,496,892 B1 12/2002 Lake et al.
6,505,297 B1 1/2003 Inamitsu et al.
6,512,356 B1 1/2003 Webb
6,512,963 B1 1/2003 Felde et al.
6,519,143 B1 2/2003 Goko
6,525,928 B1 2/2003 Madsen et al.
6,532,152 B1 3/2003 White et al.
6,542,354 B1 4/2003 Holtorf et al.
6,549,942 B1 4/2003 Janky et al.
6,549,966 B1 4/2003 Dickens et al.
6,557,049 B1 4/2003 Maloy et al.
6,564,274 B1 5/2003 Heath et al.
6,567,877 B1 5/2003 Lewis et al.
6,574,098 B2 6/2003 Netzel et al.
6,578,103 B1 6/2003 Hill et al.
6,581,125 B1 6/2003 Lange et al.
6,606,253 B2 8/2003 Jackson et al.
6,615,404 B1 9/2003 Garfunkel et al.
6,618,698 B1 9/2003 Beausoleil et al.
6,622,164 B1 9/2003 Harrison et al.
6,629,181 B1 9/2003 Alappat et al.
6,636,918 B1 10/2003 Aguilar et al.
6,643,777 B1 11/2003 Chu
6,664,377 B1 12/2003 Xu
6,666,705 B1 12/2003 Lauruhn et al.

(56) References Cited

U.S. PATENT DOCUMENTS 6,671,763 B1 12/2003 Korowitz et al.
6,687,128 B2 2/2004 Tokuhara
6,715,100 B1 3/2004 Hwang
6,718,408 B2 4/2004 Esterberg et al.
6,718,415 B1 4/2004 Chu
6,725,317 B1 4/2004 Bouchier et al.
6,727,606 B2 4/2004 Schopp et al.
6,742,068 B2 5/2004 Gallagher et al.
6,747,878 B1 6/2004 Hipp et al.
6,757,748 B1 6/2004 Hipp
6,795,926 B1 9/2004 Matula et al.
6,819,550 B2 11/2004 Jobs et al.
6,823,415 B1 11/2004 Asaad et al.
6,845,455 B2 1/2005 Kavanaugh et al.
6,898,076 B2 5/2005 Pappalardo et al.
6,948,047 B2 9/2005 Maruska et al.
6,954,850 B1 10/2005 Howard et al.
6,982,702 B1 1/2006 Frame
6,985,967 B1 1/2006 Hipp
6,992,566 B2 1/2006 Striemer
7,017,001 B2 3/2006 Hill et al.
7,020,735 B2 3/2006 Kikinis
7,075,784 B2 7/2006 Sullivan
7,099,152 B2 8/2006 Gasbarro et al.
7,099,981 B2 8/2006 Chu
7,113,394 B2 9/2006 Liang
7,146,446 B2 12/2006 Chu
7,236,353 B2 6/2007 Davidson et al.
7,242,574 B2 7/2007 Sullivan
7,245,497 B2 7/2007 Klein et al.
7,256,991 B2 8/2007 Sullivan
7,296,098 B2 11/2007 Shih
7,328,297 B2 2/2008 Chu
7,337,256 B2 2/2008 Korowitz et al.
7,339,786 B2 3/2008 Bottom et al.
7,340,763 B1 3/2008 Harris
7,363,415 B2 4/2008 Chu
7,363,416 B2 4/2008 Chu
7,376,779 B2 5/2008 Chu
7,409,477 B2 8/2008 Wyatt et al.
7,414,312 B2 8/2008 Nguyen et al.
7,420,815 B2 * 9/2008 Love ..... 361/752
7,463,481 B2 12/2008 Lev et al.
7,487,283 B2 2/2009 Sivertsen
7,502,656 B2 3/2009 Thibault et al.
7,533,408 B1 5/2009 Amouse
7,593,723 B2 9/2009 Zarom
RE41,076 E 1/2010 Chu
RE41,092 E 1/2010 Chu
7,676,624 B2 3/2010 Chu
RE41,294 E 4/2010 Chu
7,702,821 B2 4/2010 Feinberg et al.
7,720,944 B2 5/2010 Thibault et al.
7,733,635 B2 6/2010 Sullivan
7,739,361 B2 6/2010 Thibault et al.
7,761,923 B2 7/2010 Khuti et al.
7,764,506 B2 7/2010 Sullivan
7,765,599 B2 7/2010 Casas et al.
7,817,412 B2 10/2010 Sullivan
7,818,487 B2 10/2010 Chu
RE41,961 E 11/2010 Chu
7,836,237 B2 11/2010 Lien
7,860,857 B2 12/2010 Kagan et al.
RE42,168 E 2/2011 Jenkins et al.
7,882,197 B2 2/2011 Thibault et al.
7,890,927 B2 2/2011 Eldridge et al.
7,899,070 B2 3/2011 Thibault et al.
7,979,488 B2 7/2011 Thibault et al.
7,984,420 B2 7/2011 Eldridge et al.
7,990,724 B2 8/2011 Juhasz
8,023,500 B2 9/2011 Thibault et al.
8,028,272 B2 9/2011 Eldridge et al.
8,028,275 B2 9/2011 Eldridge et al.
RE42,814 E 10/2011 Chu
8,041,873 B2 10/2011 Chu
RE42,984 E 11/2011 Chu
8,060,222 B2 11/2011 Eldridge et al.
8,081,584 B2 12/2011 Thibault et al.
RE43,119 E 1/2012 Chu
8,090,452 B2 1/2012 Johnson et al.
RE43,171 E 2/2012 Chu
8,127,060 B2 2/2012 Doll et al.
8,195,852 B2 6/2012 Tantos et al.
8,225,271 B2 7/2012 Eldridge et al.
8,229,579 B2 7/2012 Eldridge et al.
8,234,436 B2 7/2012 Chu
RE43,602 E 8/2012 Chu
8,341,087 B2 12/2012 Lee
8,368,640 B2 2/2013 Dardinski et al.
8,463,964 B2 6/2013 Kostadinov et al.
RE44,468 E 8/2013 Chu
8,504,823 B2 8/2013 Carpenter et al.
8,594,814 B2 11/2013 Rovaglio et al.
RE44,654 E 12/2013 Chu
RE44,739 E 1/2014 Chu
8,626,977 B2 1/2014 Chu
8,719,112 B2 5/2014 Carpenter et al.
8,725,205 B2 5/2014 Ryan
RE44,933 E 6/2014 Chu
8,756,359 B2 6/2014 Chu
RE45,140 E 9/2014 Chu
8,977,797 B2 3/2015 Chu
9,010,623 B2 4/2015 Arnouse
9,010,645 B2 4/2015 Arnouse
9,083,812 B2 7/2015 Ryan
9,529,768 B2 12/2016 Chu
9,529,769 B2 12/2016 Chu
9,703,750 B2 7/2017 Chu
9,858,231 B2 1/2018 Roberts-Hoffman et al.
RE46,947 E 7/2018 Chu
2001/0011312 A1 8/2001 Chu
2001/0029588 A1 10/2001 Nakamura et al.
2001/0036840 A1 11/2001 Jenkens et al.
2001/0048793 A1 12/2001 Dair et al.
2002/0001175 A1 1/2002 Unrein
2002/0049803 A1 4/2002 Bandhole et al.
2002/0092160 A1 7/2002 McCullough
2002/0097555 A1 7/2002 Smith et al.
2002/0112250 A1 8/2002 Koplar
2002/0140147 A1 10/2002 Pols Sandhu et al.
2002/0166084 A1 11/2002 Raynham
2002/0174337 A1 11/2002 Aihara
2003/0005073 A1 1/2003 Yoshizawa et al.
2003/0021087 A1 1/2003 Lunsford
2003/0043771 A1 3/2003 Mizutani et al.
2003/0056125 A1 3/2003 O'Conner et al.
2003/0090878 A1 5/2003 Merkin
2003/0156383 A1 8/2003 Jenkins et al.
2004/0193764 A1 9/2004 Watanabe
2004/0268005 A1 12/2004 Dickie
2005/0101167 A1 5/2005 Weiss et al.
2005/0102451 A1 5/2005 Pan et al.
2005/0154931 A1 7/2005 Oh
2005/0162822 A1 7/2005 Shu
2005/0174729 A1 8/2005 Chu
2005/0182882 A1 8/2005 Chu
2005/0289369 A1 12/2005 Chung et al.
2006/0002070 A1 1/2006 Jenkens et al.
2006/0065431 A1 3/2006 Trucco
2006/0256792 A1 11/2006 Kwong et al.
2006/0268507 A1 11/2006 Takahashi
2007/0070566 A1 3/2007 Campini et al.
2007/0073937 A1 3/2007 Feinberg et al.
2008/0146178 A1 6/2008 Lu et al.
2008/0158805 A1 7/2008 El Bteddini
2008/0165291 A1 7/2008 Choi
2008/0239639 A1 10/2008 Yun
2008/0259551 A1 10/2008 Gavenda
2008/0304227 A1 12/2008 Liu et al.
2008/0320181 A1 12/2008 Lauterbach et al.
2009/0073693 A1 3/2009 Nall et al.
2009/0157939 A1 6/2009 Chu
2009/0217373 A1 8/2009 Stillerman et al.
2010/0099308 A1 4/2010 Busse

(56) References Cited

U.S. PATENT DOCUMENTS

| | | | |
|---|---|---|---|
| 2010/0174844 | A1 | 7/2010 | Chu |
| 2010/0194667 | A1 | 8/2010 | Lee et al. |
| 2010/0197289 | A1 | 8/2010 | Lee et al. |
| 2010/0197347 | A1 | 8/2010 | Lee et al. |
| 2010/0198994 | A1 | 8/2010 | Lee et al. |
| 2010/0199008 | A1 | 8/2010 | Lee et al. |
| 2010/0253691 | A1 | 10/2010 | Lin et al. |
| 2011/0004840 | A1 | 1/2011 | Feinberg et al. |
| 2011/0060775 | A1 | 3/2011 | Fitzgerald |
| 2012/0151098 | A1 | 6/2012 | Sullivan |
| 2013/0109202 | A1 | 5/2013 | Szczesny |
| 2016/0050071 | A1 | 2/2016 | Collart |
| 2017/0185540 | A1 | 6/2017 | Poornachandran et al. |
| 2017/0192928 | A1 | 7/2017 | Amouse |

FOREIGN PATENT DOCUMENTS

| | | | |
|---|---|---|---|
| CN | 1729734 | A | 2/2006 |
| DE | 19938837 | A1 | 1/2001 |
| EP | 551514 | A1 | 7/1993 |
| EP | 722138 | A1 | 7/1996 |
| EP | 352350 | A2 | 7/1998 |
| EP | 1026688 | A2 | 8/2000 |
| EP | 1081579 | A1 | 3/2001 |
| EP | 1102456 | A2 | 5/2001 |
| IL | 125630 | A | 11/2002 |
| JP | 55151398 | A | 11/1980 |
| JP | 60207398 | A | 10/1985 |
| JP | 61-27268 | | 2/1986 |
| JP | 61064197 | A | 4/1986 |
| JP | 4107717 | A | 4/1992 |
| JP | 4-55169 | | 5/1992 |
| JP | 11068344 | A | 3/1993 |
| JP | 5267873 | A | 10/1993 |
| JP | 05-145208 | | 11/1993 |
| JP | 6-289953 | | 10/1994 |
| JP | 6-289956 | | 10/1994 |
| JP | H7-64672 | | 3/1995 |
| JP | H7-84675 | | 3/1995 |
| JP | 8501165 | A | 2/1996 |
| JP | 3048044 | | 10/1997 |
| JP | 10056673 | A | 2/1998 |
| JP | 10173349 | A | 6/1998 |
| JP | 10-270879 | | 9/1998 |
| JP | 11065708 | A | 3/1999 |
| JP | 11143583 | A | 5/1999 |
| JP | 11-154563 | A | 6/1999 |
| JP | 2000-305652 | | 2/2000 |
| JP | 2000-507053 | A | 6/2000 |
| JP | 2001-291970 | A | 10/2001 |
| JP | 2002-0166684 | A | 1/2002 |
| JP | 2002026944 | A | 1/2002 |
| JP | 2002099350 | A | 4/2002 |
| JP | 2000232287 | A | 8/2002 |
| JP | 2002258985 | A | 9/2002 |
| JP | 2002298099 | A | 10/2002 |
| JP | 2002-252968 | | 9/2004 |
| JP | 2005-190297 | A | 7/2005 |
| KR | 10-2004-0072757 | | 8/2004 |
| KR | 10-2004-0080887 | | 9/2004 |
| KR | 10-2008-0098147 | | 11/2008 |
| RU | 2066067 | C1 | 8/1996 |
| RU | 2084953 | C1 | 7/1997 |
| WO | 18924 | A1 | 10/1992 |
| WO | 00097 | A1 | 1/1994 |
| WO | 00970 | A1 | 1/1994 |
| WO | 13640 | A1 | 5/1995 |
| WO | 14965 | A1 | 6/1995 |
| WO | 00481 | A1 | 1/1997 |
| WO | 05618 | A1 | 2/1997 |
| WO | 57626 | A2 | 11/1999 |
| WO | 69359 | A1 | 9/2001 |
| WO | 07037 | A1 | 1/2002 |
| WO | 038526 | A2 | 5/2004 |
| WO | 038527 | A2 | 5/2004 |
| WO | 038555 | A2 | 5/2004 |
| WO | 209768 | A1 | 12/2016 |

OTHER PUBLICATIONS

"Apple 'It's Showtime!' event—live coverage", https://www.macworld.com/article/1052855/showtime.html, Sep. 12, 2006, Internet (7 pages).

"Apple TV", https://web.archive.org/web/20070114013600/http://store.apple.com/1-800-MY-APPLE/WebObjects/AppleStore.woa/6214003/wa/PSLID?mco=AC3DA57D&nclm=AppleTV&wosid=tVawQghrqNWj2U99zDQ0NASbPoD, Jan. 7, 2007, Internet (4 pages).

* cited by examiner

MOBILE MOTHERBOARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

This invention is directed to central processors and motherboards for use in computers.

BACKGROUND

In the early days of computing, computer devices were configured to operate from a fixed location. Even today, a personal computer set up in a home would generally be useable only from the home. As such, these computers are geographically limited.

With the advent of mobile computing, some computer devices have become portable. A lap top computer or a mobile cell phone may travel with the user and generally be useable from any location. These portable computing devices have become devices that generally can be used anywhere, anytime.

Computer devices generally include a motherboard, memory, a keyboard and a display. The motherboard contains the "brains" of the computer device. The motherboard is the physical arrangement that holds the CPU. Motherboards also hold the memory, the basic input/output system (BIOS), expansion slot and interconnecting circuitry.

A conventional computer device is provided with its own motherboard. Each motherboard sits inside a computer box. The location of the motherboard inside the box makes it difficult to reach one or more of the parts of the motherboard if the part is to be replaced or upgraded. In particular, to replace or upgrade a part, a user needs to disassemble the computer box and reach inside the box to reach the part. Also, by locating the motherboard inside the box, the motherboard becomes integrated into the computer box. Accordingly, a motherboard is a dedicated device that is designed to serve one master—namely, the computer device into which the motherboard is integrated. Dedication of a motherboard to a master limits what the motherboard can do to tasks that are defined by the master. If a master is idle, the motherboard gets little use.

The present invention overcomes this and other shortcomings by providing a motherboard that is portably configured to serve more than one computer device.

SUMMARY

I have devised a computer system comprising a portable motherboard which when connected with a computer box having internal circuitry and communication ports, a keyboard terminal and a display forms the computer system. In the preferred embodiment of a personal computer, the motherboard comprises a microprocessor and a connector. The computer box comprises a connector externally accessible from the computer box for receiving and electrically communicating with said motherboard connector, and circuitry interconnecting said computer box connector to the internal circuitry of the computer box for operating the communication ports of the computer box. Connection of the portable motherboard to the computer box enables the computer box to perform computing operations including keyboard terminal and display functions.

In an alternative computer system, the computer box is a laptop computer containing the keyboard terminal and display. The laptop computer comprises a connector externally accessible from the laptop computer for receiving and electrically communicating with said motherboard connector, and circuitry interconnecting said laptop computer connector to the internal circuitry of the laptop computer for operating the laptop computer. Connection of the portable motherboard to the laptop computer enables the laptop computer to perform computing operations including keyboard terminal and display functions.

The portable motherboard I have devised may further comprise a hand held substrate, a microprocessor being attached. to said substrate; a connector attached to said substrate; and circuitry interconnecting said microprocessor to said motherboard connector. In other embodiments, the portable motherboard comprises memory attached to said substrate; and/or basic input/output system BIOS attached to said substrate; and/or expansion slots; together with circuitry interconnecting the expansion slots to the motherboard connector.

My inventive method provides a motherboard with a connecter; provides a computer box or laptop with an externally accessible connector for receiving the motherboard connector; and connects the motherboard connector to the externally accessible computer box or laptop connector to form a computer system.

PREFERRED EMBODIMENT

Figure 1:
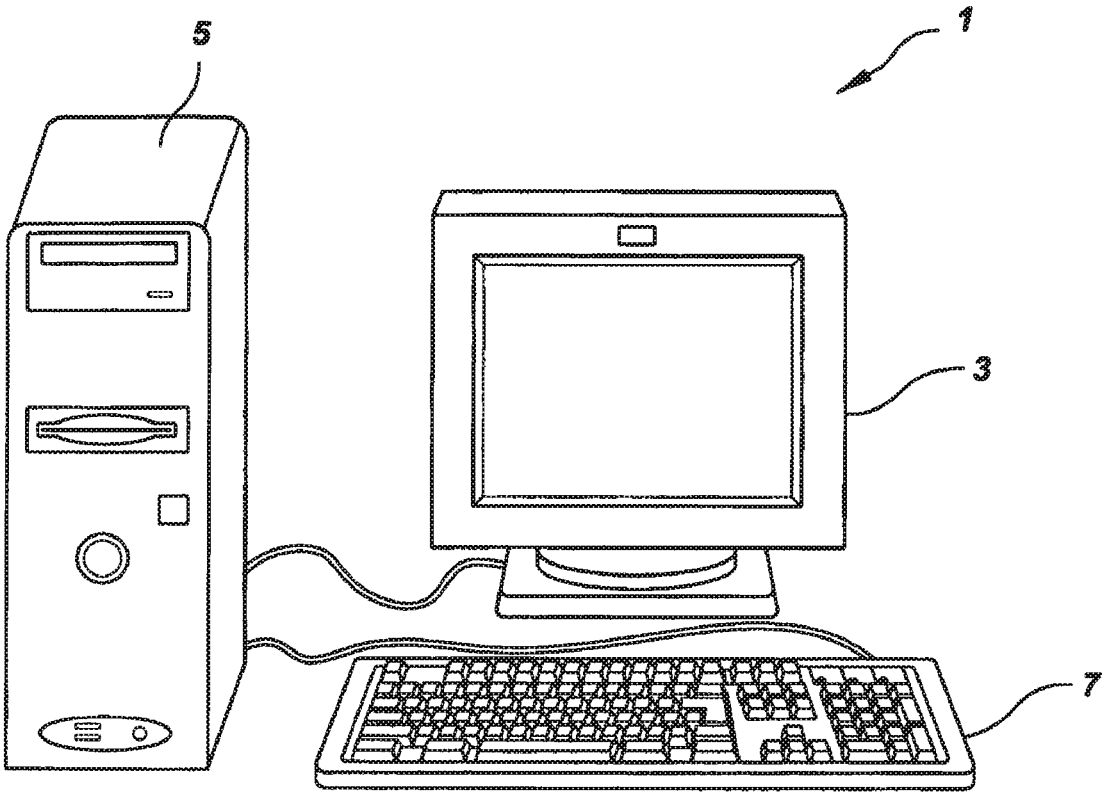
FIG. 1 shows a prior art computer system.

FIG. 1 shows a prior art computer system 1 comprising a computer box 5, a display 3 and a keyboard 7. The computer box contains a motherboard with central processing unit. Computer system 1 may also be a laptop computer wherein the motherboard, display and keyboard are integrated into a single unit. By "computer box" is meant a housing of any form factor that in the prior art contains a motherboard with central processing unit. The computer box may be the form factor for a laptop if the computer box is provided with an integrated display and keyboard.

Figure 2:
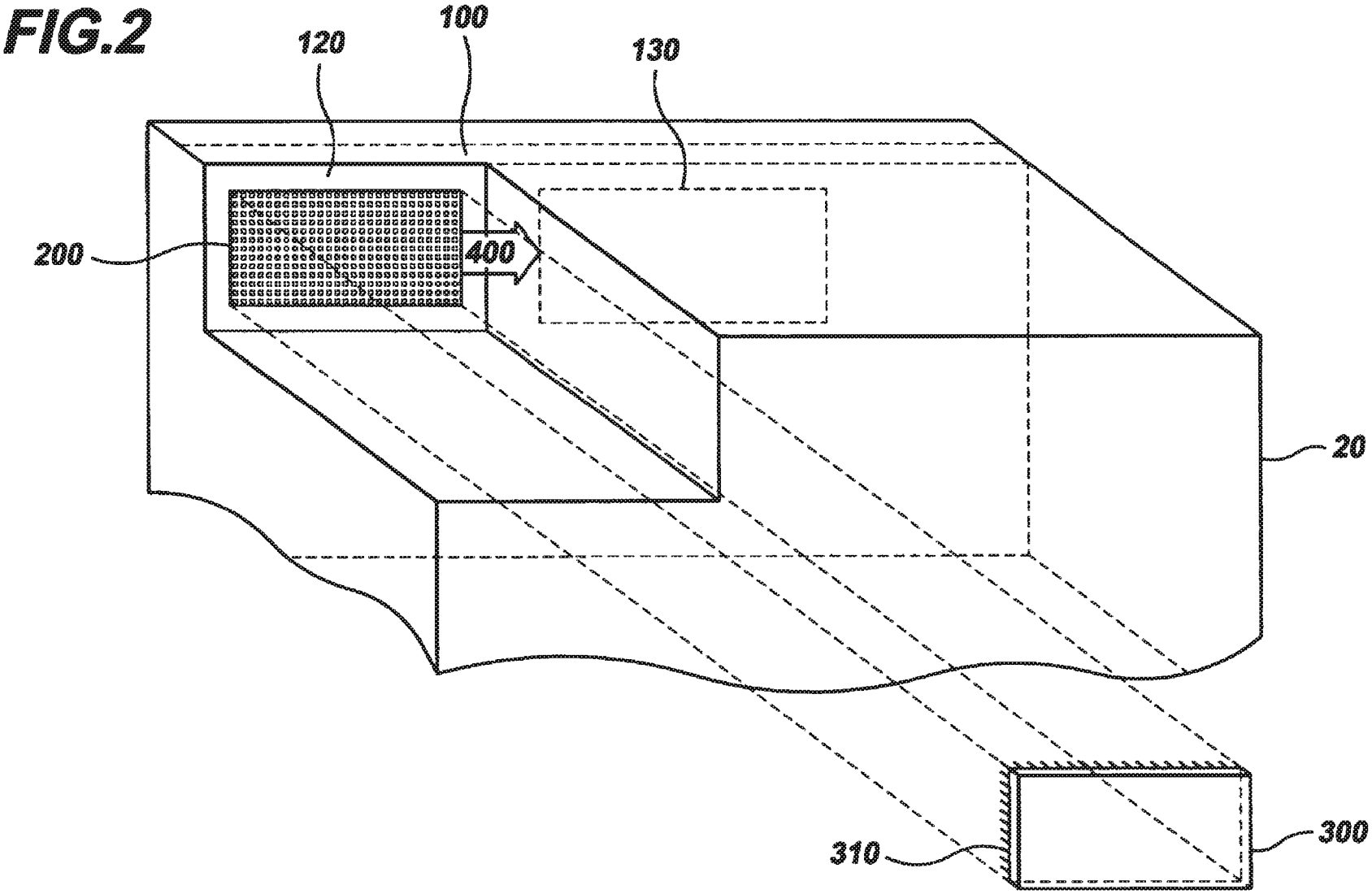
FIG. 2 shows a perspective view of the invention.
Figure 3:
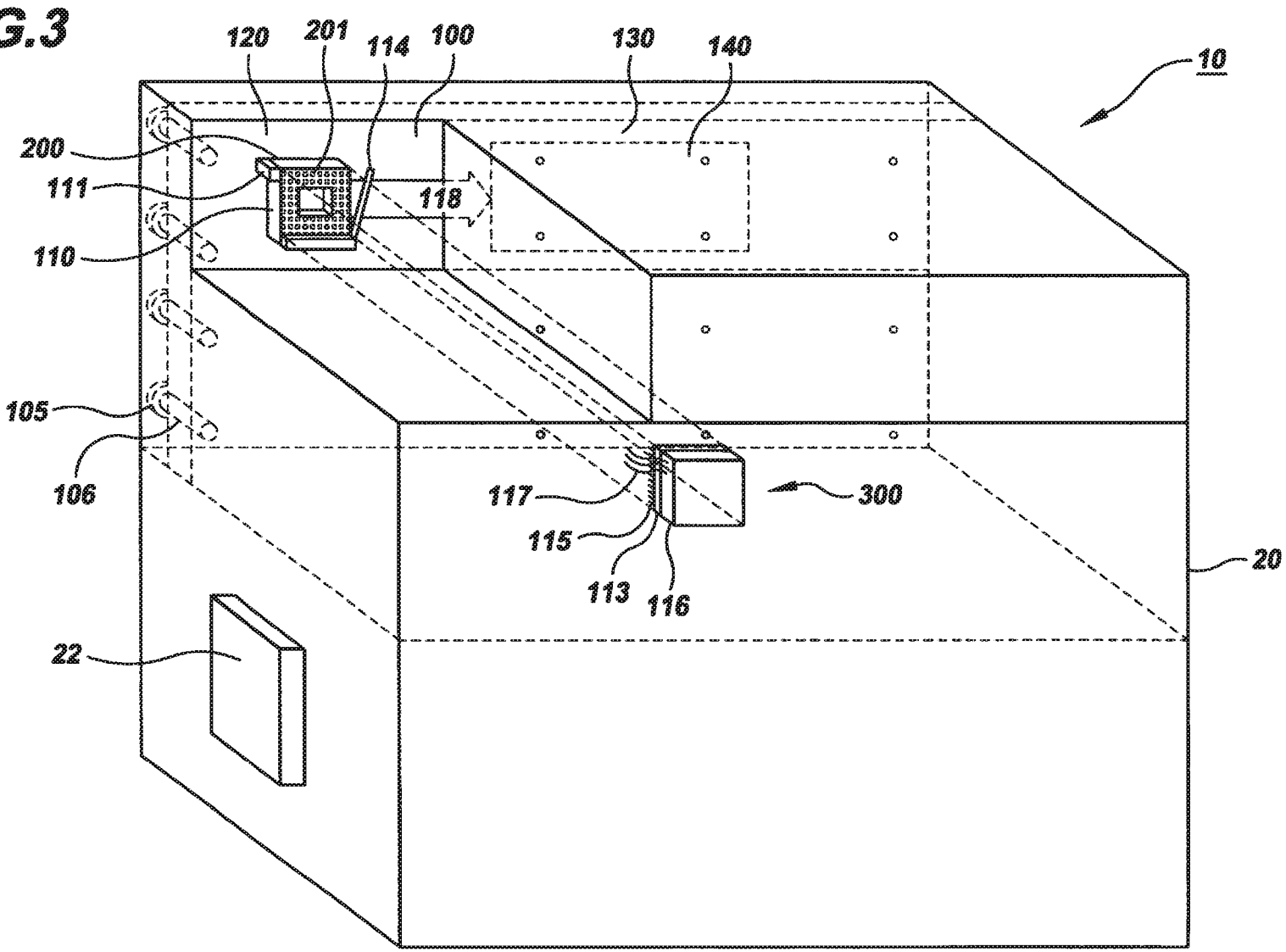
FIG. 3 shows a preferred embodiment of the invention.

FIG. 2 broadly shows a perspective view of the invention. FIG. 2 shows a portion of a computer box 20 of the invention. FIG. 3 shows a perspective of the computer box that is implemented using a first preferred embodiment of the invention.

Referring again to FIG. 2, the computer system of the invention comprises a portable motherboard 300, a motherboard socket 200, a bus 400 and a substrate 100. Motherboard socket 200 is electrically connected to bus 400 and both motherboard socket 200 and bus 400 are connected to substrate 100 which is connected to computer box 20. Specifically, motherboard socket 200 is connected to a first portion 120 of substrate 100 which is accessible from outside of computer box 20. A second portion 130 of substrate 100 lies inside computer box 20.

Figure 6:
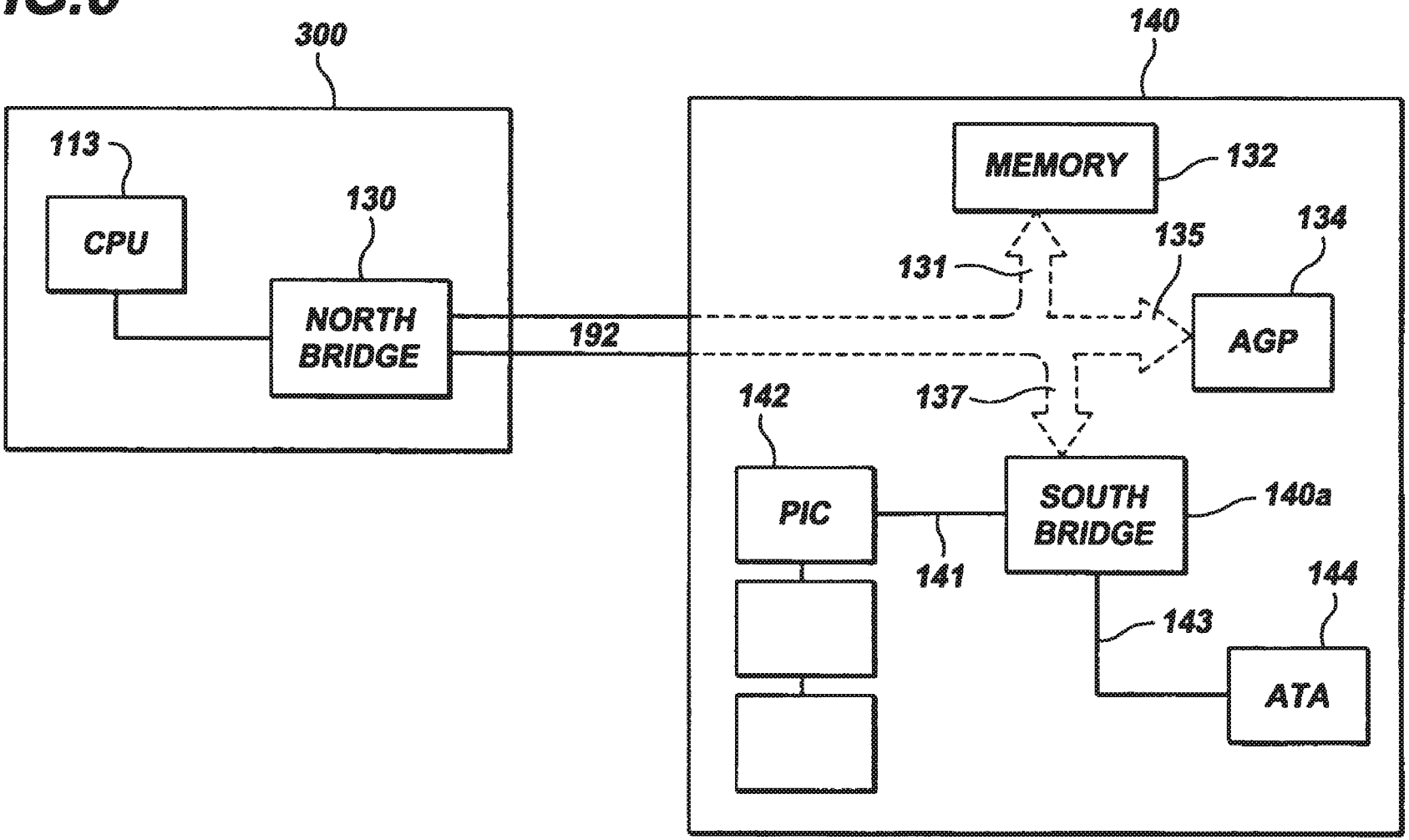
FIG. 6 shows yet another alternative embodiment of time invention.
Figure 7:
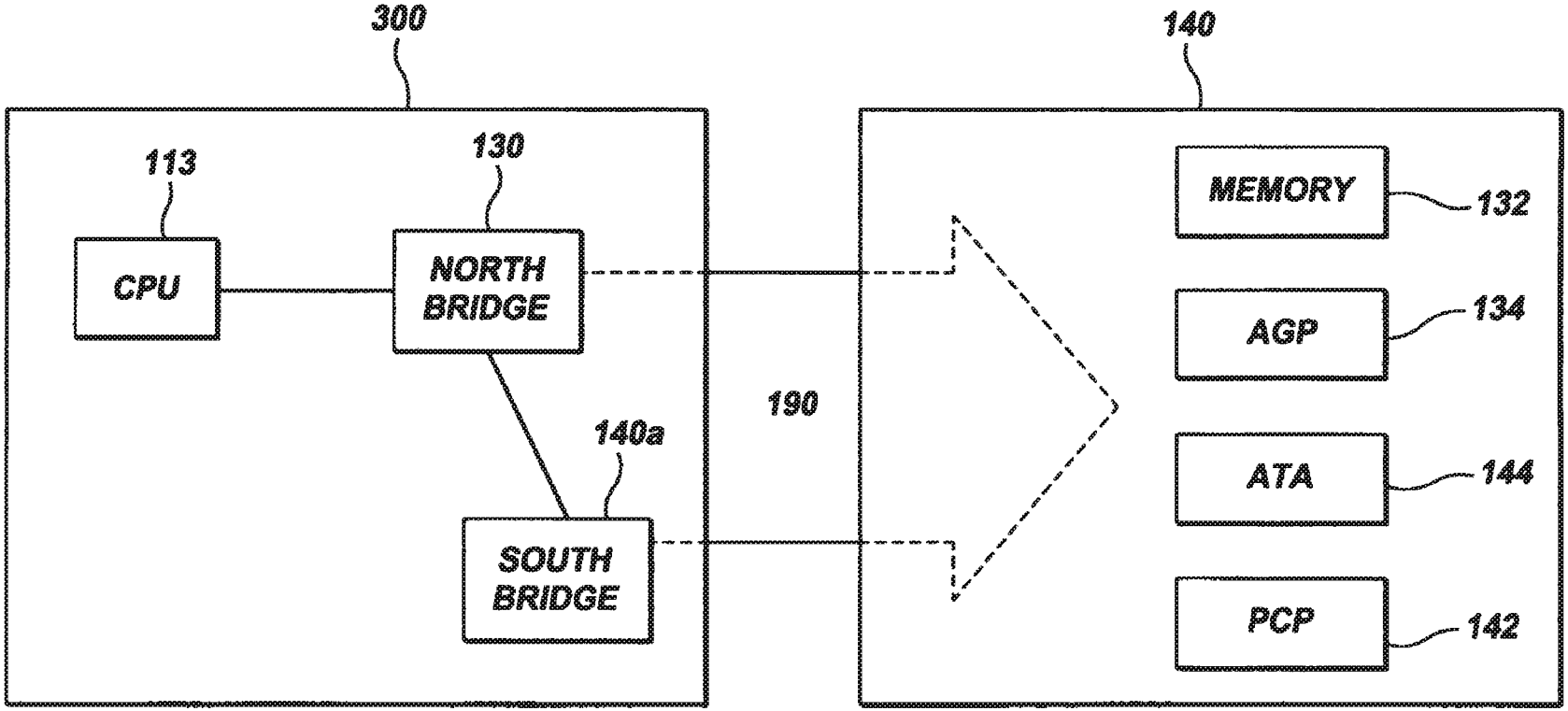
FIG. 7 shows still another alternative embodiment of the invention.

In the preferred embodiment shown in FIG. 3, portable motherboard 300 comprises a central processor 113. Alternatively, as shown in FIG. 6, portable motherboard 300 comprises a central processor 113 and a North Bridge 130. As yet another embodiment, as shown in FIG. 7, portable motherboard 300 comprises a central processor 113, North Bridge 130 and South Bridge 140a. Yet other embodiments of the invention may also be used. For instance, other distributions of the foregoing and or other chips between the portable motherboard and the computer box may be used.

In use, when portable motherboard 300 is connected to motherboard socket 200, central processor 113 may directly or by activation of a switch located on either portable motherboard or computer box 20 be placed into electrical connection with data bus 118 and hence with circuitry internal to computer box 20 to provide processing capability to computer box 20.

FIG. 3 shows a first preferred embodiment of the invention wherein portable motherboard 300 comprises central processor 113 with connection pins 115 and cooling fan 116 with three wire leads 117. Connection pins 115 mate with connector receptacles 201 on motherboard socket 200. Lever 114 found on motherboard socket 200 is used to provide a tight electrical connection between portable motherboard 300 and motherboard socket 200. Three wire leads 117 from cooling fan 116 on portable motherboard 300 provide electrical connection to pins 111 on first portion 120 of substrate 100 for powering fan 116. Substrate 100 is held to computer box 20 by screws 105 and away from the wall of computer box 20 by spacers 106. Also shown on computer box 20 is disk drive 22. Electrical bus 118 provides electrical connectivity between central processor 113 of motherboard 300 and circuitry 140 residing on second portion 130 of substrate 100.

Figure 4:
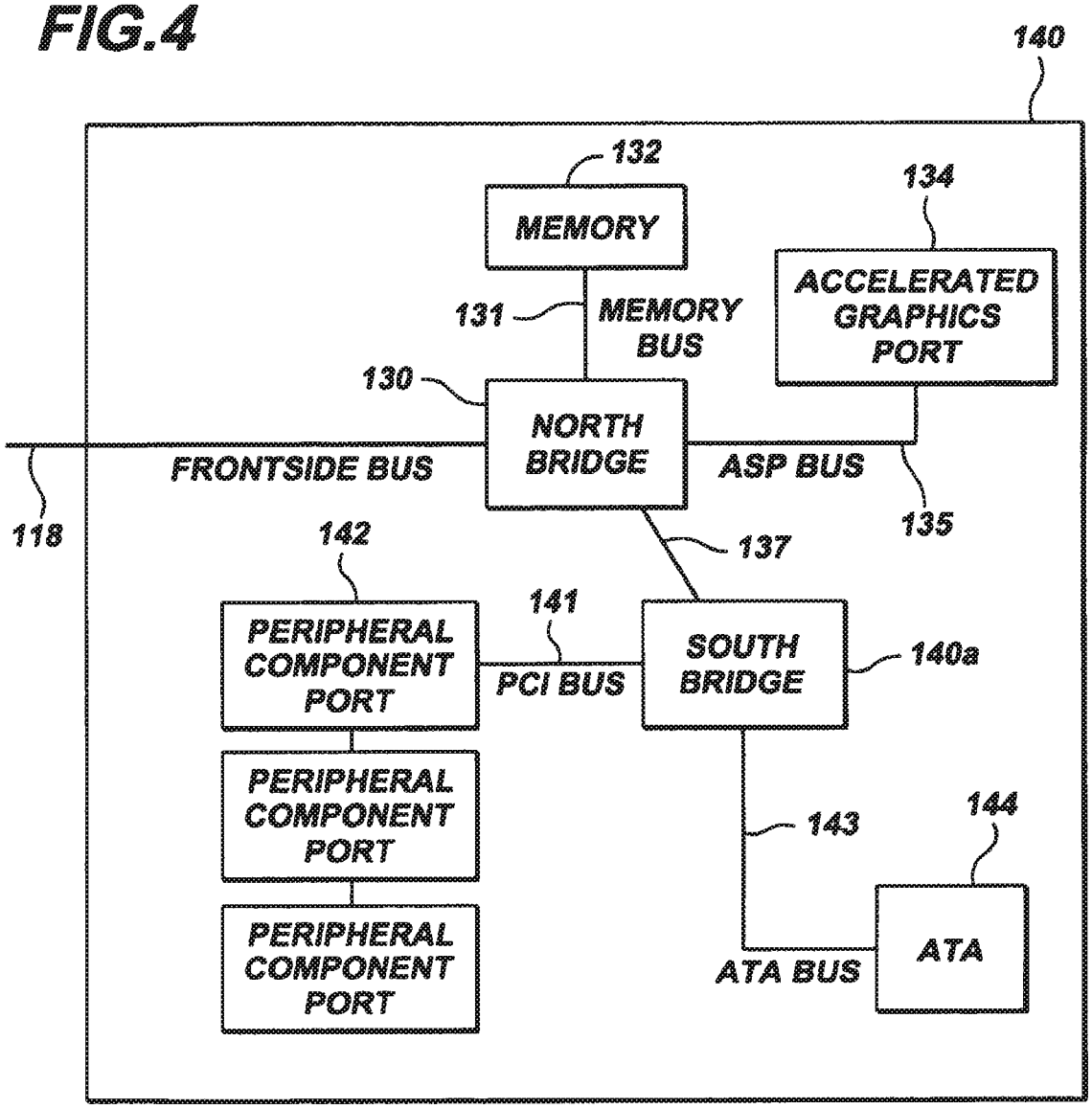
FIG. 4 shows a block diagram of functions of a motherboard internal to the computer.

FIG. 4 shows a functional block diagram of circuitry 140. Circuitry 140 comprises a North Bridge 130 and a South Bridge 140a. North Bridge 130 is electrically connected through memory bus 131 to memory 132, is electrically connected through AGP bus 135 to accelerated graphics port 134, and is electrically connected through bus 137 to South Bridge 140a. South Bridge 140a is electrically connected through PCI bus 141 to peripheral component port(s) 142 and is electrically connected through ATA bus 143 to ATA 144. Each of these components are well known in the art.

Figure 5:
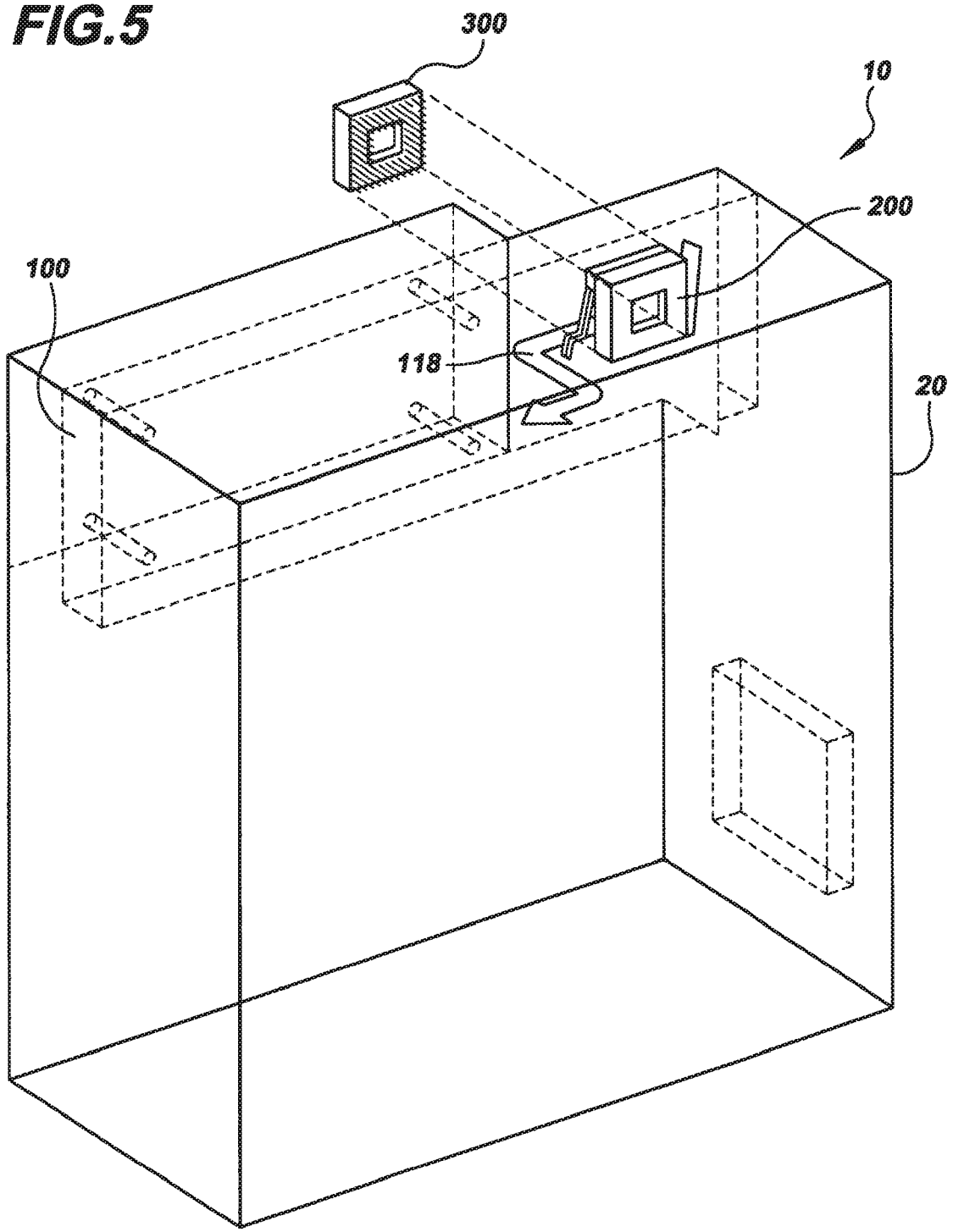
FIG. 5 is an alternative embodiment of the invention.

FIG. 5 shows an alternative embodiment of the invention wherein substrate 100 is a two sided printed circuit board. Electrical bus 118 in this embodiment carries data from portable motherboard 300 through substrate 100 to circuitry residing on the other side of substrate.

FIG. 6 shows an alternative embodiment of the invention. In this embodiment, portable motherboard 300 comprises central processing unit 113 and North Bridge 130. Data bus 192 provides electrical connection of both central processing unit 113 and North Bridge 130 to circuitry 140 residing inside computer box 20. Circuitry 140 in this example comprises memory 132, AGP 134, South Bridge 140a, ATA 144, and PIC 142 which are electrically connected to data bus 192 through bus 131, bus 135, bus 137, bus 143 and bus 141, respectively.

FIG. 7 shows yet another embodiment. In this embodiment, portable motherboard 300 comprises central processing unit 113, North Bridge 130, and South Bridge 140a. Data bus 190 provides electrical connection of central processing unit 113, North Bridge 130, and South Bridge 140 to circuitry 140 residing inside computer box 20. Circuitry 140 in this example comprises memory 132, AGP 134, ATA 144, and PCP 142.

Figure 8:
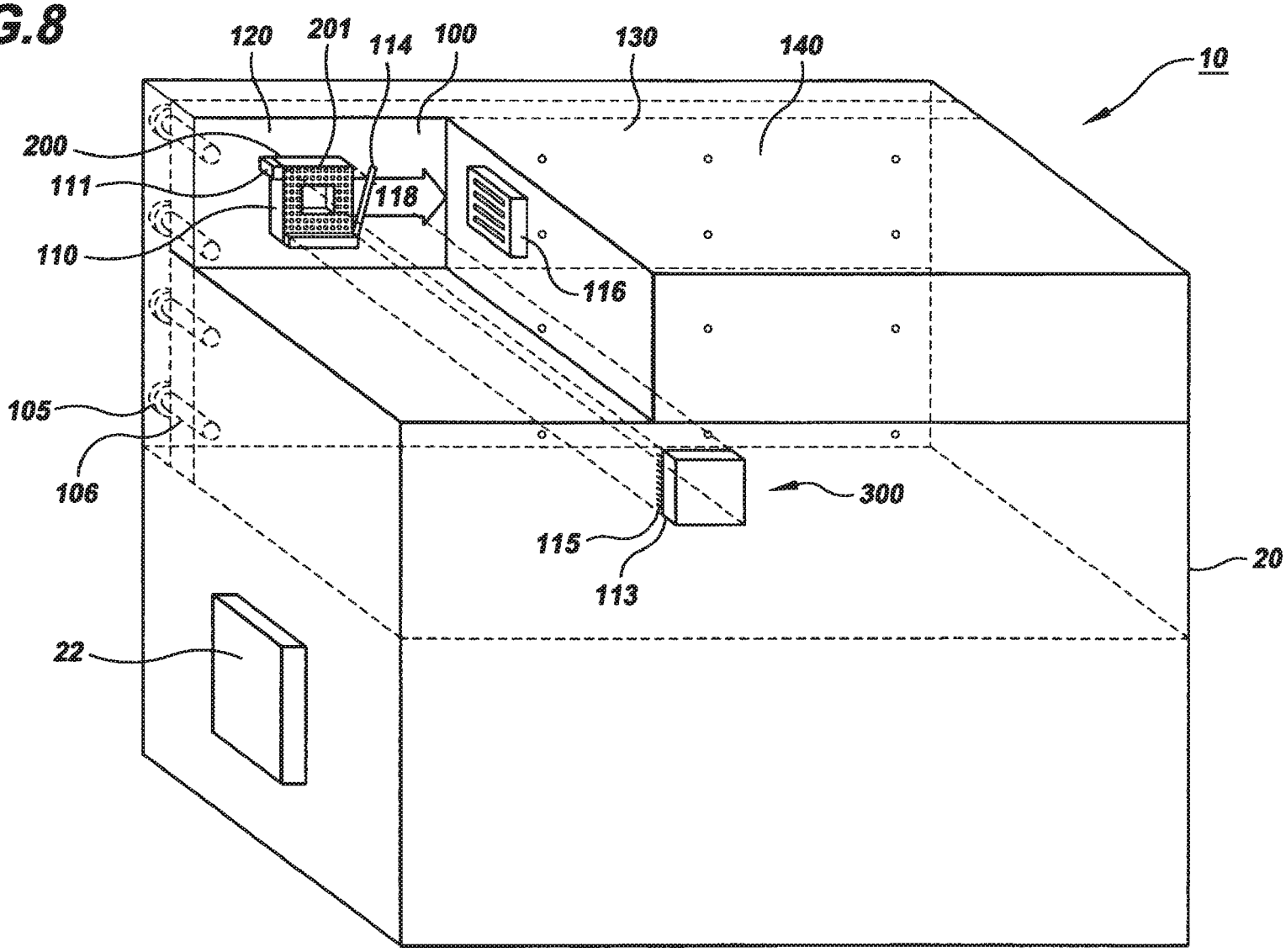
FIG. 8 shows still another alternative embodiment of the invention.
Figure 9:
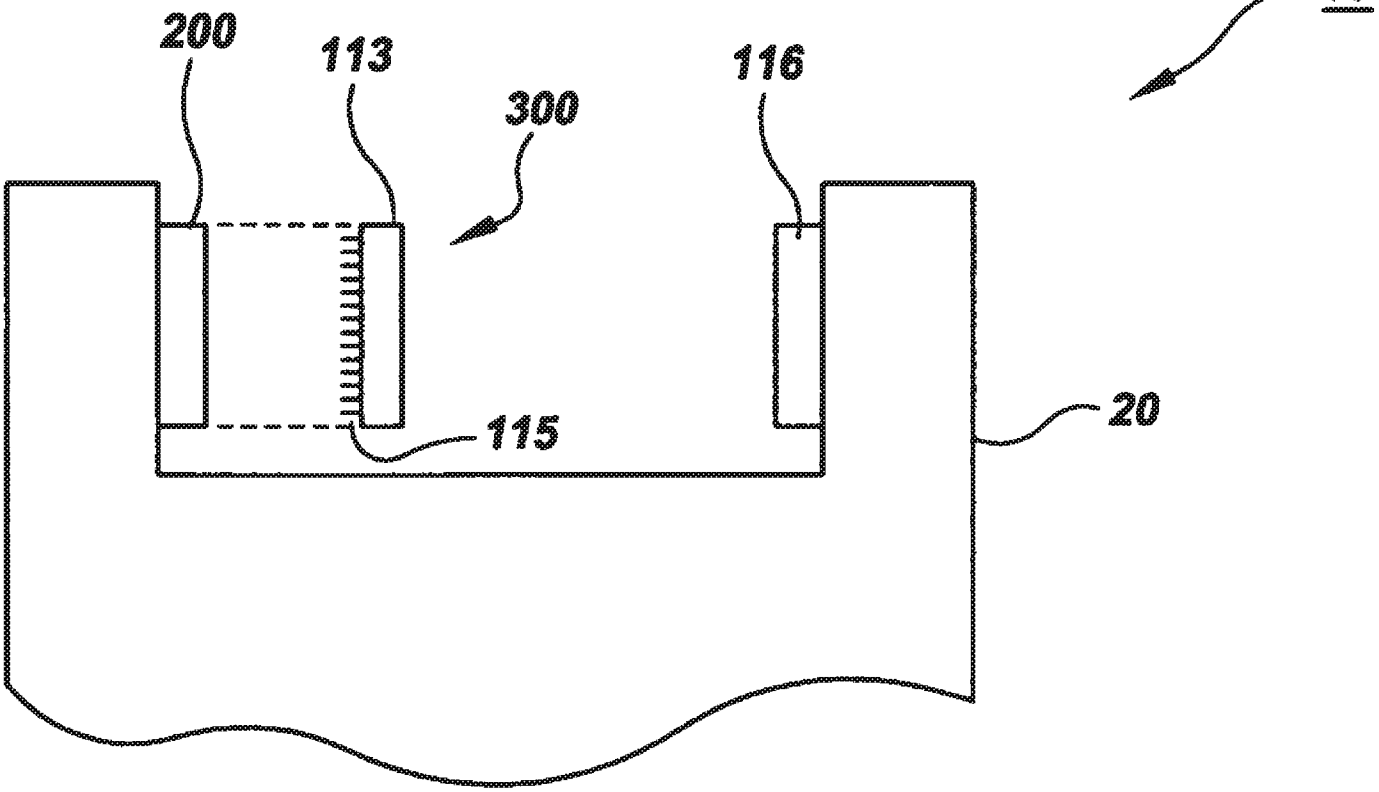
FIG. 9 shows still another alternative embodiment of the invention.

FIG. 8 shows the embodiment of FIG. 3 with fan 116 being integrated to computer box 20 for providing cooling. This embodiment further mobilizes portable motherboard 300 of the FIG. 3 embodiment by stripping the motherboard of any fan and fan connection hardware that may be required to dissipate heat from the motherboard. Preferably, in this embodiment the fan is integrated to the outside of the computer box. Alternatively, the fan may be integrated to the inside of a computer box facing outwardly with the computer box being provided with a grill for allowing forced air generated by the fan to pass outside of the computer box to dissipate heat from the motherboard. In another embodiment shown in FIG. 9, fan 116 is so integrated to computer box 20 as to lie along the same axis as the installed portable motherboard 300. This form fact further enhances the dissipation of heat generated by the portable motherboard.

It will be appreciated that the location of portable motherboard 300 external to the computer box improves the heat dissipation properties of the motherboard by exposing the motherboard to the natural air flow in the environment instead of confining the heat dissipation from the motherboard to the use of forced air inside of a closed computer box. While a number of the previously described embodiments make use of a fan in providing for heat dissipation from the motherboard, in some instances depending upon the heat dissipation requirements of the motherboard, the natural air flow occurring outside of the computer box may provide sufficient cooling of the motherboard. In those instances, the natural air flow may minimize the need for use of a fan for providing forced cooling of the motherboard or may make the use of a fan to provide forced cooling unnecessary altogether.

With the above and other embodiments, the inventive motherboard is portably configured to serve one or more computers. Preferably, the computer is a personal computer or laptop. Alternatively, the computer may be a server. Yet alternatively, the computer may be a mobile phone. Still alternatively, the computer may be any device that requires a microprocessor to function whether or not the device has a keyboard and/or a display.

Figure 10:
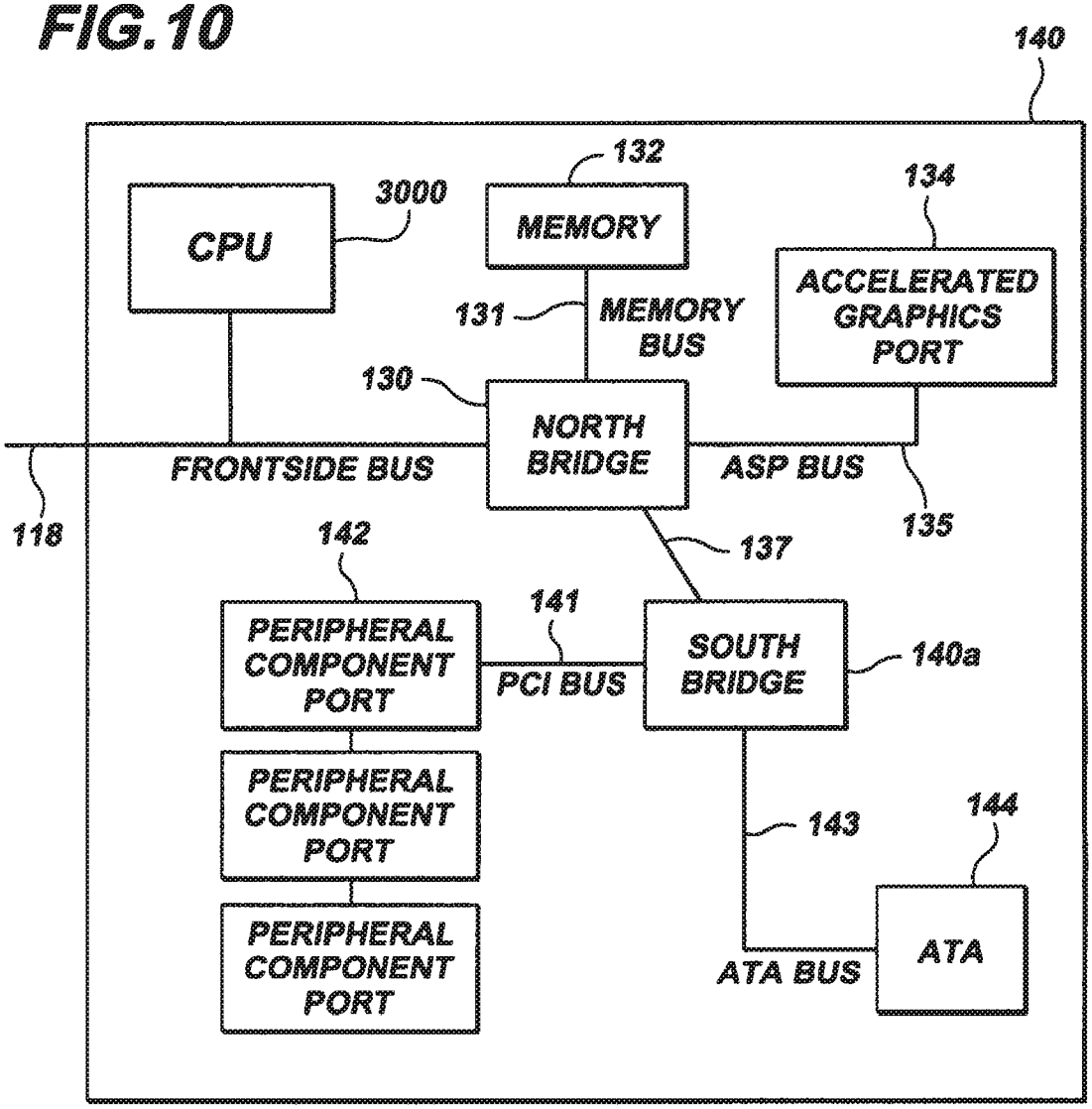
FIG. 10 shows still another alternative embodiment of the invention.

The portable motherboard provides a computer box with a brain. Alternatively, where a computer with a brain is slow, the portable motherboard may be used to boost the brainpower of the slow computer. As shown in FIG. 10, the FIG. 3 portable motherboard may be electrically connected to a computer having internal circuitry 140 having a CPU 3000 in order to boost the microprocessing capability of the computer. Whether the portable motherboard brings life to a computer box or boosts the microprocessor power of a computer containing an internal microprocessor, the portable motherboard is a powerful invention that makes microprocessor power more efficient and ubiquitous.

While the invention has been described in connection with specific embodiments, it is evident that numerous alternatives, modifications, and variations will be apparent to those skilled in the art within the spirit and scope of the invention described above.

I claim:

1. A computer system comprising: a computer box *without a processor for performing computing operations*, said computer box comprising: a housing; circuitry enclosed by said housing; a bus internal to said housing connected to said circuitry; and a first communication port for enabling electrical connection of circuitry external to said housing to said internal bus; and a portable *and handholdable* motherboard external to the housing comprising: a central processor, a *motherboard* bus connected to said *central* processor, a *motherboard* connector for engagement with said first communication port for enabling electrical connection of said *central* processor through said [processor] *motherboard* bus to said internal bus of said computer box; one or more second communication ports for enabling electrical connection of circuitry external to said to motherboard to said motherboard bus; wherein connection of said [portable] motherboard connector to said first communication port enables said computer box to perform computing operations*; and wherein said motherboard includes Northbridge and Southbridge circuitry*.

2. The motherboard of claim 1 further comprising a basic input/output system BIOS in electrical communication with said processor.

3. The motherboard of claim 1 wherein said computer box includes a display.

4. The motherboard of claim 1 wherein said computer box includes a keyboard.

5. The motherboard of claim 1 wherein said computer box includes a keyboard and a display.

6. The motherboard of claim 1 wherein said one or more second communication ports enables electrical connection of one or more graphics cards to said motherboard bus.

7. The motherboard of claim 1 wherein said one or more second communication ports enables electrical connection of one or more peripherals to said motherboard bus.

8. The motherboard of claim 1 wherein said computer box is taken from the group consisting of a laptop and a personal computer.

9. The motherboard of claim 1 wherein said computer box is a server.

10. The motherboard of claim 1 wherein said computer box is a mobile phone.

11. A computer system comprising: a computer box, said computer box comprising: a housing; a first central processor enclosed by said housing; a bus internal to said housing connected to said first [microprocessor] *central processor*; and a first communication port for enabling electrical connection of circuitry external to said housing to said internal bus; and a portable *and handholdable* motherboard external to the housing comprising: a second central processor, a *motherboard* bus connected to said second [microprocessor] *central processor*, a *motherboard* connector for engagement with said first communication port for enabling electrical connection of said second *central* processor through said [second processor] *motherboard* bus to said internal bus of said computer box; one or more second communication ports for enabling electrical connection of circuitry external to said motherboard to said motherboard bus; wherein connection of said [portable] motherboard connector to said first communication port enables [the] *said* second central processor to add to the central processing functions of said first *central* processor*; and wherein said motherboard includes Northbridge and Southbridge circuitry*.

12. The motherboard of claim 11 further comprising a basic input/output system BIOS in electrical communication with said processor.

13. The motherboard of claim 11 wherein said computer box includes a display.

14. The motherboard of claim 11 wherein said computer box includes a keyboard.

15. The motherboard of claim 11 wherein said computer box includes a keyboard and a display.

16. The motherboard of claim 11 wherein said one or more second communication ports enables electrical connection of one or more graphics cards to said motherboard bus.

17. The motherboard of claim 11 wherein said one or more second communication ports enables electrical connection of one or more peripherals to said motherboard bus.

18. The motherboard of claim 11 wherein said computer box is taken from the group consisting of a laptop and a personal computer.

19. The motherboard of claim 11 wherein said computer box is a server.

20. The motherboard of claim 11 wherein said computer box is a mobile phone.

*21. The computer system of claim 1 wherein said motherboard further comprises a cooling fan.*

*22. The computer system of claim 11 wherein said motherboard further comprises a cooling fan.*

*23. A computer system comprising: a computer box, said computer box comprising: a housing; circuitry enclosed by said housing; a bus internal to said housing connected to said circuitry; and a first communication port for enabling electrical connection of circuitry external to said housing to said internal bus; and a portable and handholdable motherboard external to the housing comprising: a central processor, a motherboard bus connected to said processor, a motherboard connector for engagement with said first communication port for enabling electrical connection of said processor through said motherboard bus to said internal bus of said computer box; a second communication port for enabling electrical connection of circuitry external to said motherboard to said motherboard bus; wherein connection of said motherboard connector to said first communication port enables said computer box to perform computing operations; wherein said motherboard further comprises a cooling fan; and wherein said motherboard includes Northbridge and Southbridge circuitry.*

*24. A computer system comprising: a computer box, said computer box comprising: a housing; circuitry enclosed by said housing; a bus internal to said housing connected to said circuitry; and a first communication port for enabling electrical connection of circuitry external to said housing to said internal bus; and a portable and handholdable motherboard external to the housing comprising: a central processor, a motherboard bus connected to said processor, a motherboard connector for engagement with said first communication port for enabling electrical connection of said processor through said motherboard bus to said internal bus of said computer box; a plurality of communication ports for enabling electrical connection of circuitry external to said motherboard to said motherboard bus; wherein connection of said motherboard connector to said first communication port enables said computer box to perform computing operations; and wherein said motherboard includes Northbridge and Southbridge circuitry.*

* * * * *